(12) United States Patent
Nakajo

(10) Patent No.: US 6,669,363 B2
(45) Date of Patent: *Dec. 30, 2003

(54) RADIATION CASSETTE

(75) Inventor: Masakazu Nakajo, Minamiashigara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 75 days.

This patent is subject to a terminal disclaimer.

(21) Appl. No.: 10/023,937

(22) Filed: Dec. 21, 2001

(65) Prior Publication Data

US 2002/0085680 A1 Jul. 4, 2002

(30) Foreign Application Priority Data

Dec. 28, 2000 (JP) ........................................ 2000-402638

(51) Int. Cl.$^7$ ................................................ G03B 42/04
(52) U.S. Cl. ................ 378/182; 378/185; 250/484.4; 206/455
(58) Field of Search ................ 378/182, 185, 378/169, 187, 188; 250/484.4, 582; 206/455; 396/511, 512, 517, 518

(56) References Cited

U.S. PATENT DOCUMENTS

| | | | | |
|---|---|---|---|---|
| 4,782,505 A | * | 11/1988 | Ogo | 378/182 |
| 5,101,423 A | * | 3/1992 | Okamoto et al. | 378/182 |
| 5,806,844 A | * | 9/1998 | Bailey et al. | 271/145 |
| 6,217,019 B1 | * | 4/2001 | Ishiduka et al. | 271/147 |
| 6,312,169 B1 | * | 11/2001 | Keilegom et al. | 396/517 |
| 6,412,772 B1 | * | 7/2002 | Itoh et al. | 271/145 |
| 2001/0050975 A1 | * | 12/2001 | Nakajo | 378/182 |

FOREIGN PATENT DOCUMENTS

JP 6-90424 11/1994

OTHER PUBLICATIONS

Patent Abstract of Japan, 63103230, May 7, 1988.

* cited by examiner

Primary Examiner—Edward J. Glick
Assistant Examiner—Irakli Kiknadze
(74) Attorney, Agent, or Firm—Sughrue Mion, PLLC

(57) ABSTRACT

A radiation cassette has a housing for accommodating a radiation image recording medium, a lid openably and closably mounted on a portion of the housing, a light-shielding plate disposed in a remaining portion of the housing, the lid being swingably mounted on the light-shielding plate, and a support mechanism for pressing the radiation image recording medium against and supporting the radiation image recording medium on an inner surface of the housing when a radiation is applied to the radiation image recording medium, and releasing the radiation image recording medium from being pressed when the radiation image recording medium is loaded into and unloaded out of the housing.

8 Claims, 9 Drawing Sheets

RADIATION CASSETTE

BACKGROUND OF THE INVENTION

1. Field of the Invention

The present invention relates to a radiation cassette having a housing for storing a radiation image recording medium and a lid openably and closably mounted on a portion of the housing.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display unit such as a CRT or the like.

The stimulable phosphor is a phosphor which, when exposed to an applied radiation (X-rays, α-rays, γ-rays, electron beams, ultraviolet radiation, or the like), stores a part of the energy of the radiation, and, when subsequently exposed to applied stimulating rays such as visible light, emits light in proportion to the stored energy of the radiation. Usually, a sheet provided with a layer of the stimulable phosphor is used as a stimulable phosphor sheet.

It has been practiced to apply a radiation, e.g., X-rays, to a subject such as a human body, to record radiation image information of the subject directly on a photographic film. The radiation image information recorded on the photographic film is subsequently developed into a visible image, which will be used for a medical diagnosis or the like.

Each radiation image recording medium such as a stimulable phosphor sheet or a photographic film is usually housed in a cassette and loaded into an exposure apparatus where X-rays are applied to the radiation image recording medium through the cassette.

One known cassette is disclosed in Japanese patent publication No. 6-90424, for example. As shown in FIG. 9 of the accompanying drawings, the disclosed cassette comprises a housing 2 for housing a radiation image recording medium 1 therein, a lid 3 openably and closably mounted on a portion of the housing 2, and a light-shielding plate 4 disposed in a remaining portion of the housing 2 for holding the radiation image recording medium 1 in a light-shielded fashion in the housing 2 in coaction with the lid 3.

With the disclosed cassette, the radiation image recording medium 1 is loaded into and unloaded out of the housing 2 while the lid 3 mounted on the housing 2 is being open. The cassette has a gap between an inner surface of the housing 2 and the light-shielding plate 4. The gap is larger than the width of the radiation image recording medium 1 in order to allow the radiation image recording medium 1 to be smoothly and reliably taken into and out of the housing 2 and prevent the radiation image recording medium 1 from being scratched.

After the radiation image recording medium 1 is stored in the cassette, however, the radiation image recording medium 1 tends to move in the housing 2 because of the large gap between the inner surface of the housing 2 and the light-shielding plate 4. Consequently, the radiation image recording medium 1 cannot be held reliably in intimate contact with a lead plate, and it is difficult to perform a desired image forming process on the radiation image recording medium 1.

Particularly, if a copper plate is disposed on a side of the radiation image recording medium 1 where the radiation is applied, then the close contact that is achieved between the copper plate, the radiation image recording medium 1, and the copper plate serves as an important image forming condition to be fulfilled. With the disclosed cassette, however, such an important image forming condition cannot be satisfied because the lid 3 is openably and closably mounted on the portion of the housing 2.

SUMMARY OF THE INVENTION

It is a major object of the present invention to provide a radiation cassette of simple structure which is capable of holding a radiation image recording medium in intimate contact with a lead plate within a housing, with a lid openably and closably mounted on a portion thereof, and of smoothly loading the radiation image recording medium into the housing and unloading the radiation image recording medium out of the housing.

With a radiation cassette according to the present invention, a radiation image recording medium is loaded into and unloaded out of a housing when a lid mounted on a portion of the housing is open. After the radiation image recording medium is accommodated in the housing, when a radiation is applied to the radiation image recording medium, the radiation image recording medium is pressed against and supported on an inner surface of the housing by a support mechanism.

The radiation image recording medium can reliably be held in contact with a lead plate within the housing, allowing a desired image to be formed highly accurately on the radiation image recording medium. When the radiation image recording medium is loaded into and unloaded out of the housing, the radiation image recording medium is released from being pressed by the support mechanism. Therefore, the radiation image recording medium is smoothly and reliably delivered, and is effectively prevented from being scratched.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
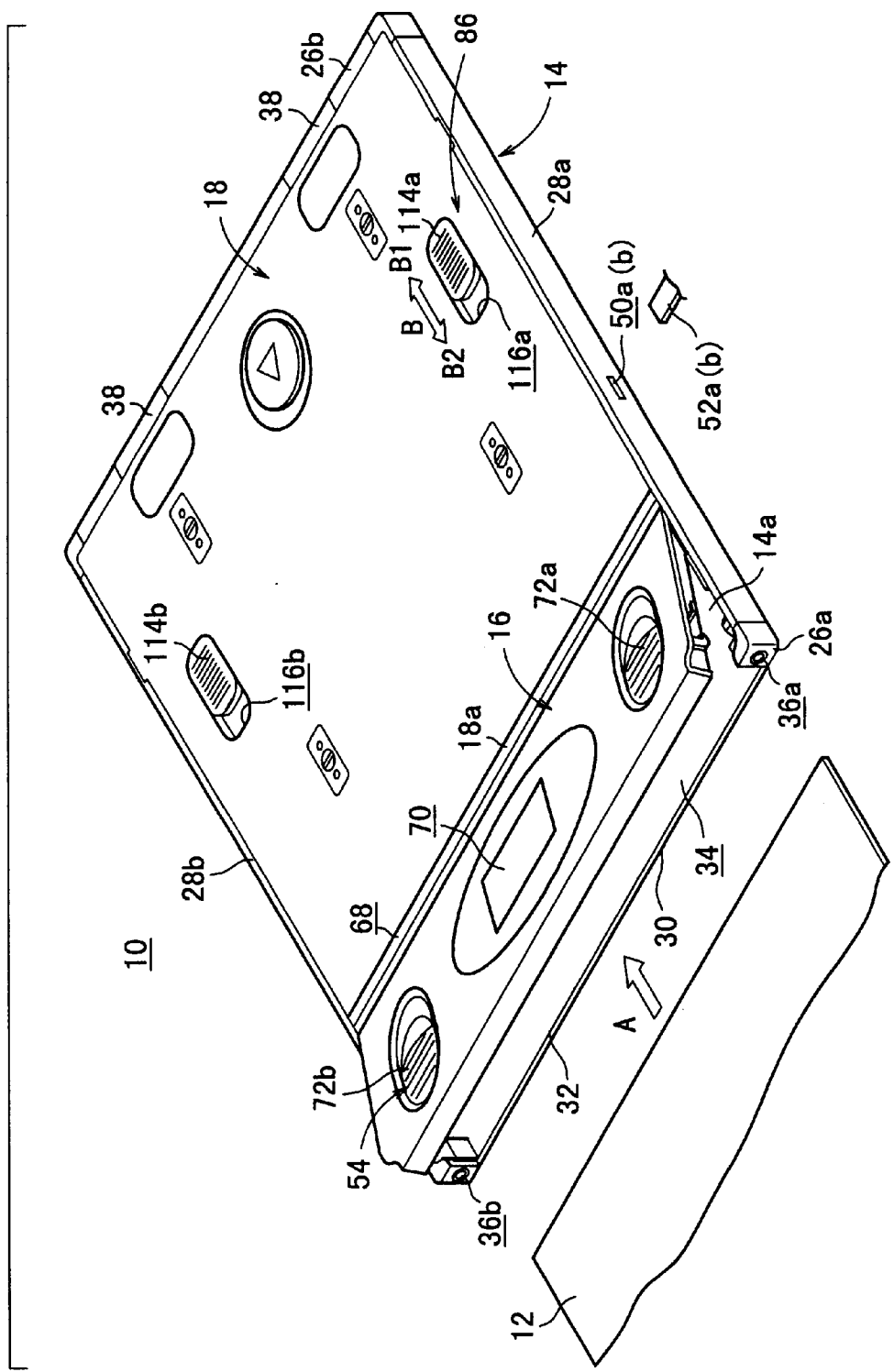
FIG. 1 is a perspective view of a radiation cassette according to the present invention.
Figure 2:
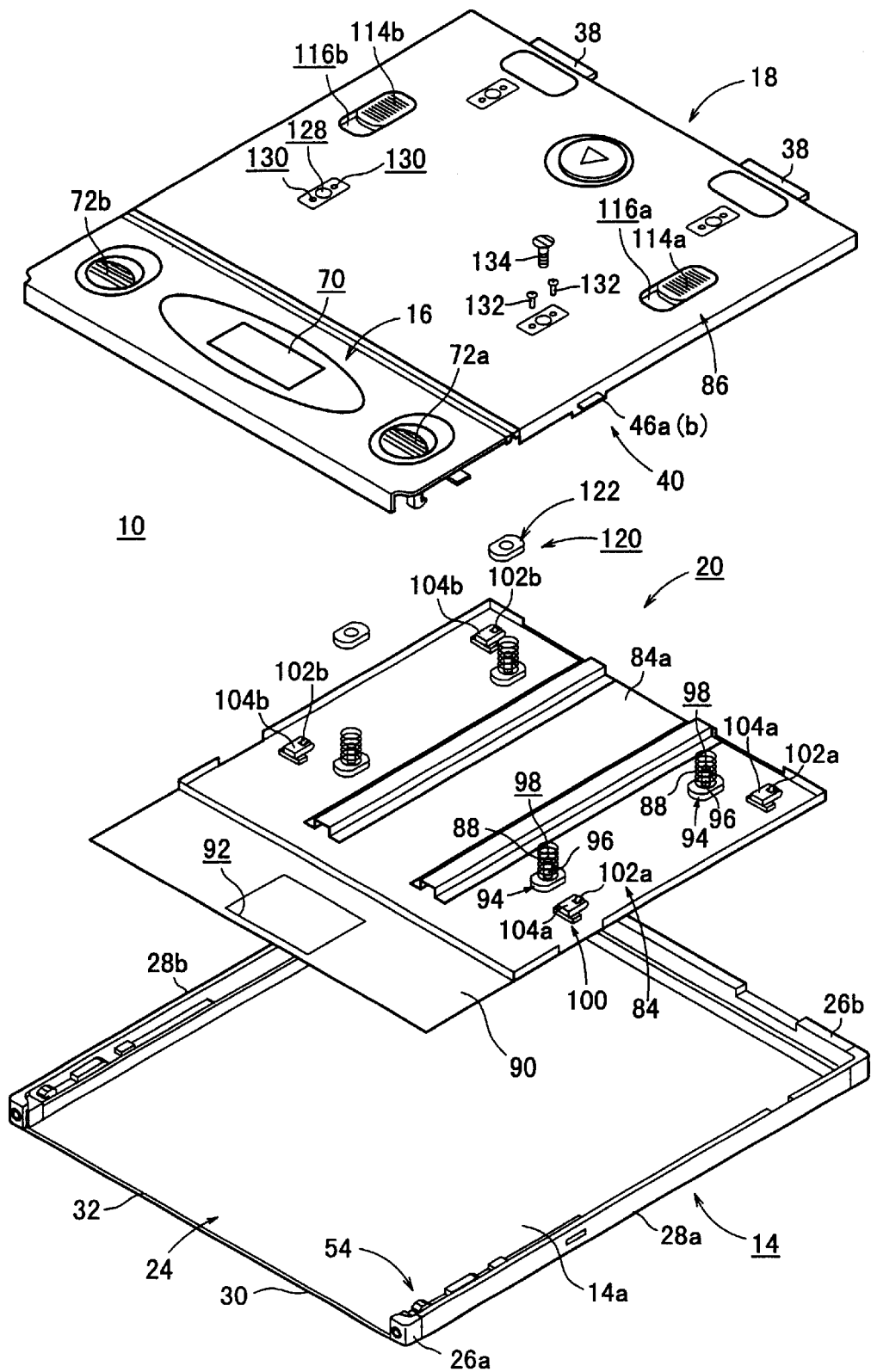
FIG. 2 is an exploded perspective view of the radiation cassette.
Figure 3:
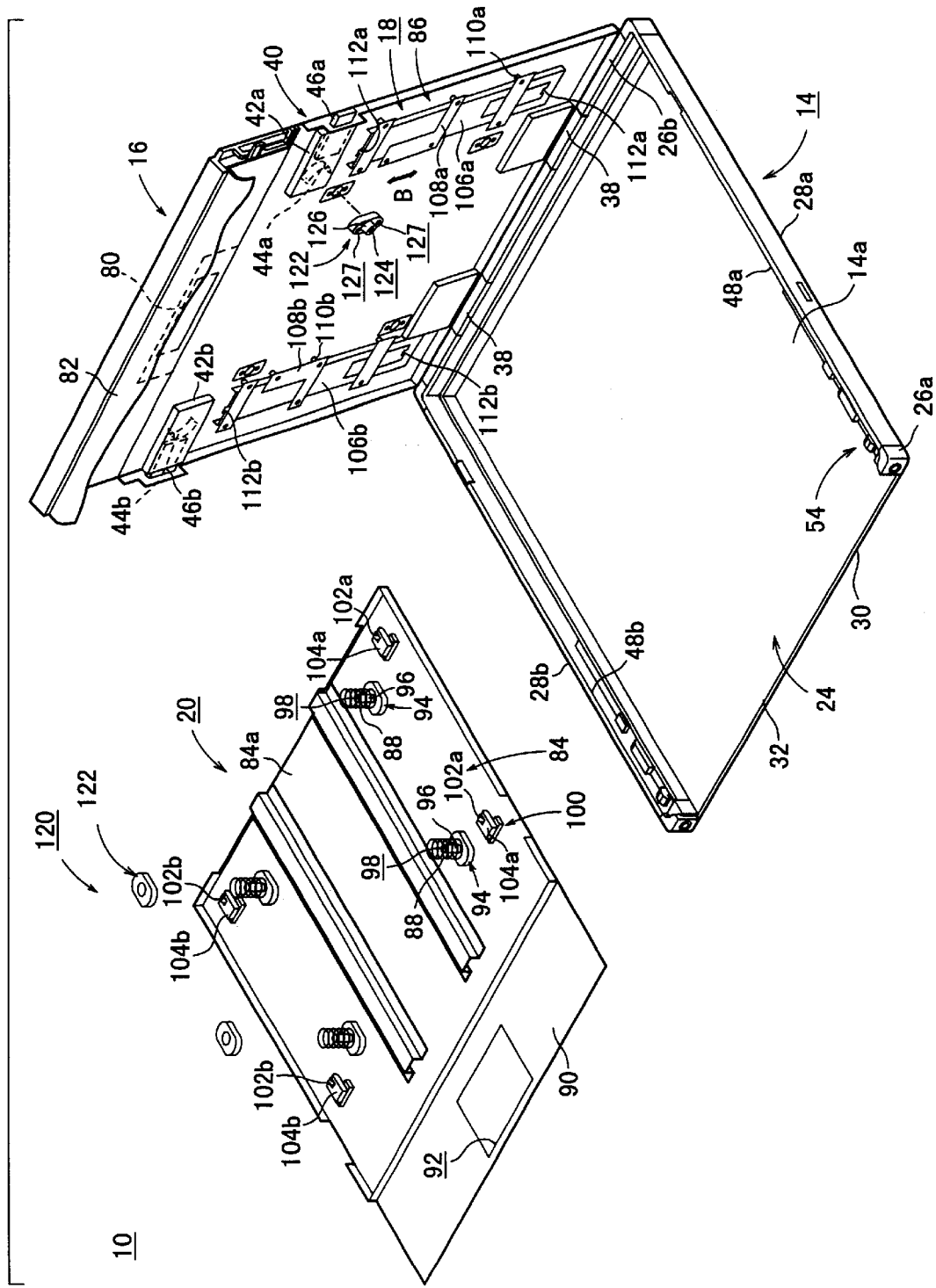
FIG. 3 is a partly exploded perspective view of the radiation cassette as it is in an open state.

FIG. 1 shows in perspective a radiation cassette 10 according to the present invention. FIG. 2 shows the radiation cassette 10 in exploded perspective. FIG. 3 shows in partly exploded perspective the radiation cassette 10 as it is in an open state.

The radiation cassette 10 comprises a housing 14 for storing a stimulable phosphor sheet (radiation image recording medium) 12 therein, a lid 16 openably and closably mounted on a portion of the housing 14, a light-shielding plate 18 disposed in a remaining portion of the housing 14 and having an end 18a on which the lid 16 is swingably mounted, and a support mechanism 20 for pressing the stimulable phosphor sheet 12 against and supporting the stimulable phosphor sheet 12 on an inner surface 14a of the housing 14 when a radiation is applied to the stimulable phosphor sheet 12, and releasing the stimulable phosphor sheet 12 from being pressed when the stimulable phosphor sheet 12 is loaded into and unloaded out of the housing 14.

The housing 14 comprises a bottom wall 24, end walls 26a, 26b disposed on upstream and downstream ends thereof in the direction (indicated by the arrow A) in which the stimulable phosphor sheet 12 is inserted into the housing 14, and side walls 28a, 28b extending along the bottom wall 24 in the direction in which the stimulable phosphor sheet 12 is inserted into the housing 14. The bottom wall 24 has a copper plate 30 which has an outer surface to which the radiation is applied. A protective sheet 32 is applied to an inner surface of the copper plate 30, providing the inner surface 14a of the housing 14.

The end wall 26a has an opening 34 through which the stimulable phosphor sheet 12 is inserted into and removed from the housing 14. The end wall 26a also has holes 36a, 36b defined therethrough on opposite sides of the opening 34 for inserting presser pins for releasing a lid lock means 54, which will be described later on.

The light-shielding plate 18 serves to close an upper portion of the housing 14, and is detachably mounted on the housing 14 by a pair of hinges 38 connected between the light-shielding plate 18 and the end wall 26b. A lock means 40 is disposed on the light-shielding plate 18 and the side walls 28a, 28b for locking the end 18a of the light-shielding plate 18 to the housing 14. The lock means 40 is retractable under external forces to unlock the light-shielding plate 18 from the housing 14.

As shown in FIG. 3, the lock means 40 has a pair of casings 42a, 42b mounted on opposite sides of an inner surface 18b of the light-shielding plate 18, and a pair of lock members 46a, 46b movably disposed in the respective casings 42a, 42b and normally biased toward the respective side walls 28a, 28b of the casing 14 by respective springs 44a, 44b. The lock members 46a, 46b have respective distal ends projecting toward the respective side walls 28a, 28b and engageable with respective inner surfaces of flanges 48a, 48b of the side walls 28a, 28b.

The side walls 28a, 28b have unlocking holes 50a, 50b defined respectively therein for the insertion therein of respective unlocking pins 52a, 52b to push in the lock members 46a, 46b. The lid 16 which is swingably mounted on the light-shielding plate 18 can be fixed to the housing 14 by a lid lock means 54.

Figure 4:
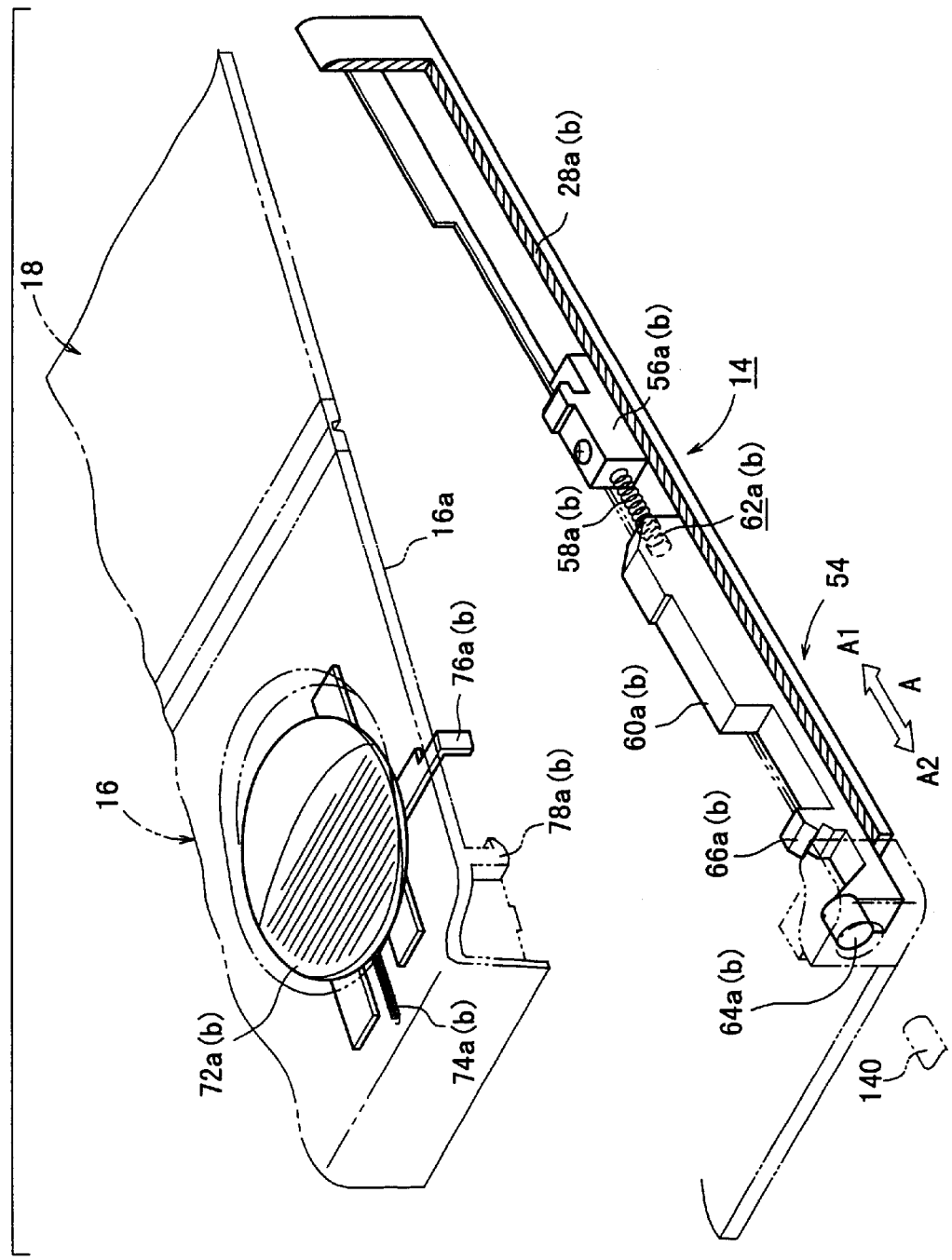
FIG. 4 is a fragmentary perspective view of a lock means of the radiation cassette.

As shown in FIG. 4, the lid lock means 54 has fixed blocks 56a, 56b fixedly mounted respectively on the side walls 28a, 28b. Springs 58a, 58b have ends engaging the respective fixed blocks 56a, 56b and other ends inserted in respective holes 62a, 62b that are defined in respective sliders 60a, 60b. The sliders 60a, 60b have on respective distal ends thereof cylindrical pin abutments 64a, 64b that can be inserted into the respective holes 36a, 36b in the housing 14, and also have respective lower lock fingers 66a, 66b which are spaced a given distance rearwardly, i.e., in the direction indicated by the arrow A1, from the pin abutments 64a, 64b.

As shown in FIG. 1, the lid 16 is integrally coupled to the end 18a of the light-shielding plate 18 by a hinge 68, and openably and closably mounted on the housing 14. The lid 16 has a bar-code reading window 70 at its center and a pair of unlocking knobs 72a, 72b of the lid lock means 54 disposed one on each side of the bar-code reading window 70. The unlocking knobs 72a, 72b are normally biased forwardly in the direction indicated by the arrow A2 (FIG. 4) by respectively springs 74a, 74b.

Unlocking plates 76a, 76b engaging the respective sliders 60a, 60b are disposed beneath the unlocking knobs 72a, 72b, respectively. The lid 16 has a pair of upper lock fingers 78a, 78b projecting from an inner surface 16a thereof for engagement with the respective lower lock fingers 66a, 66b.

An elastic member 80 (see FIG. 3) of sponge, rigid rubber, or the like for pressing the stimulable phosphor sheet 12 toward the inner surface 14a of the housing 14 is mounted on the inner surface 16a of the lid 16. A protective sheet 82 is fixed at one end thereof to the inner surface 16a of the lid 16 for smoothly guiding the stimulable phosphor sheet 12. The protective sheet 82 is folded back at the distal end of the lid 16 and extends toward the light-shielding plate 18.

As shown in FIGS. 2 and 3, the support mechanism 20 comprises a presser plate 84 mounted on the inner surface 18b of the light-shielding plate 18 and movable toward and away from the inner surface 14a of the housing 14, a manipulating member 86 operable from outside of the light-shielding plate 18 for moving the presser plate 84 toward and away from the inner surface 14a of the housing 14, and a plurality of springs 88 for normally urging the presser plate 84 toward the inner surface 14a of the housing 14. A lead sheet 90, serving as a lead plate, is applied to a face side of the presser plate 84. The lead sheet 90 has an opening 92 defined therein in registration with the window 70 of the lid 16.

Four first attachments 94 are mounted on a reverse side 84a of the presser plate 84. The first attachments 94 have respective rods 96 at their center which have threaded holes 98 defined therein to a given depth, and respective springs 88 disposed around the rods 96. Two pairs of rollers 102a, 102b of a taper structure 100 are mounted on the reverse side 84a of the presser plate 84 by respective blocks 104a, 104b. The rollers 102a, 102b are positioned outwardly of the first attachments 94 on the reverse side 84a, and spaced a given distance from the reverse side 84a by the blocks 104a, 104b.

As shown in FIG. 3, the manipulating member 86 has a pair of slide plates 106a, 106b guided by a plurality of guide plates 108a, 108b for movement within the plane of the inner surface 18b of the light-shielding plate 18 in the directions indicated by the arrow B. The guide plates 108a, 108b are fastened by screws to cylindrical spacers 110a, 110b mounted on the inner surface 18b of the light-shielding plate 18. The cylindrical spacers 110a, 110b provide a gap between the inner surface 18b of the light-shielding plate 18 and the guide plates 108a, 108b, and the slide plates 106a, 106b are disposed in the gap for movement within the plane of the inner surface 18b of the light-shielding plate 18.

As shown in FIGS. 5 through 8, each of the slide plates 106a, 106b is bent in a channel-shaped cross section, and two tapered members 112a, 112b of the taper structure 100 are disposed on each of the slide plates 106a, 106b. The tapered members 112a, 112b are positioned for coaction with the rollers 102a, 102b, and comprise plates bent away from the inner surface 18b. When the tapered members 112a, 112b engage the rollers 102a, 102b, the presser plate 84 is spaced from the stimulable phosphor sheet 12. When the tapered members 112a, 112b disengage from the rollers 102a, 102b, the presser plate 84 presses the stimulable phosphor sheet 12 toward the inner surface 14a of the housing 14 under the bias of the springs 88.

Knobs 114a, 114b are fixed to the slide plates 106a, 106b, respectively. The knobs 114a, 114b, which are made of synthetic resin, are exposed out of the light-shielding plate 18 through respective openings 116a, 116b that are defined in the light-shielding plate 18. The openings 116a, 116b are so shaped as to allow the knobs 114a, 114b to slide in the directions indicated by the arrow B.

As shown in FIGS. 2 and 3, a holder 120 for holding the presser plate 84 on the light-shielding plate 18 is mounted on the inner surface 18b of the light-shielding plate 18. The holder 120 has second attachments 122 mounted on the inner surface 18b in alignment with the respective first attachments 94. The second attachments 122 have respective through holes 124 defined therein, respective projections 126 projecting toward the first attachments 94, and respective pairs of threaded holes 127 defined therein on opposite sides of the through holes 124.

The light-shielding plate 18 has four holes 128 defined therein and pairs of tapered holes 130 defined therein on opposite sides of the holes 128. Setscrews 132 are inserted into the respective tapered holes 130 and then threaded into the threaded holes 127 in the second attachments 122, thus fastening the second attachments 122 to the light-shielding plate 18. Screws 134 are inserted from the holes 128 into the through holes 124 in the second attachments 122, and threaded into the threaded holes 98 in the first attachments 94, thus holding the presser plate 84 for movement toward and away from the light-shielding plate 18 by a given distance. The springs 88 are interposed between the first and second attachments 94, 122.

Operation of the radiation cassette 10 thus constructed will be described below.

For inserting the stimulable phosphor sheet 12 into the radiation cassette 10 before radiation image information is recorded on the stimulable phosphor sheet 12, the operator directly manipulates the knobs 72a, 72b of the lid lock means 54 on the lid 16, or inserts the unlocking pins 140 into the holes 36a, 36b in the housing 14 in a non-illustrated loading device, as shown in FIG. 4, thereby unlocking the lid lock means 54.

Then, when the lid 16 is opened away from the housing 14 about the hinge 68, the opening 34 in the housing 14 is opened, and the stimulable phosphor sheet 12 is inserted through the opening 34 into the housing 14. When the lid 16 is pressed toward the housing 14, the upper lock fingers 78a, 78b on the inner surface 16a of the lid 16 abut against the respective lower lock fingers 66a, 66b on the sliders 60a, 60b, and push the lower lock fingers 66a, 66b in the direction indicated by the arrow A1.

After the sliders 60a, 60b are moved in the direction indicated by the arrow A1, the sliders 60a, 60b are moved back in the direction indicated by the arrow A2 by the springs 58a, 58b, bringing the lower lock fingers 66a, 66b into engagement with the upper lock fingers 78a, 78b thereby to lock the lid 16 to the housing 14.

The radiation cassette 10 with the stimulable phosphor sheet 12 accommodated therein is then loaded into an image recording apparatus, not shown. In the image recording apparatus, a radiation representing the radiation image information of a subject, not shown, is applied from the side of the bottom wall 24 of the radiation cassette 10 to record the radiation image information on the stimulable phosphor sheet 12.

Before the radiation is applied to the stimulable phosphor sheet 12, the support mechanism 20 is manually or automatically actuated. Specifically, when the stimulable phosphor sheet 12 is to be loaded into and unloaded out of the housing 14, the tapered members 112a, 112b on the slide plates 106a, 106b engage the respective rollers 102a, 102b, keeping the presser plate 84 spaced from the stimulable phosphor sheet 12 (see FIGS. 5 and 6).

When the knobs 114a, 114b are slid along the openings 116a, 116b in the direction indicated by the arrow B1, i.e., in the direction away from the lid 16, the slide plates 106a, 106b to which the knobs 114a, 114b are fixed are moved in the direction indicated by the arrow B1 while being guided by the guide plates 108a, 108b. The tapered members 112a, 112b on the slide plates 106a, 106b disengage from the respective rollers 102a, 102b, and the presser plate 84 is moved toward the inner surface 14a of the housing 14 under the bias of the springs 88 (see FIGS. 7 and 8).

The stimulable phosphor sheet 12 is now reliably held in intimate contact with the copper plate 30 and the lead sheet 90 of the housing 14. A desired image can thus be formed highly accurately on the stimulable phosphor sheet 12 under the image forming condition which is maintained at a high level. The manipulating member 86 is combined with the taper structure 100 which has the rollers 102a, 102b, the slide plates 106a, 106b, and the tapered members 112a, 112b. Accordingly, the presser plate 84 is reliably and smoothly moved toward and away from the stimulable phosphor sheet 12 with a simple arrangement.

Figure 5:
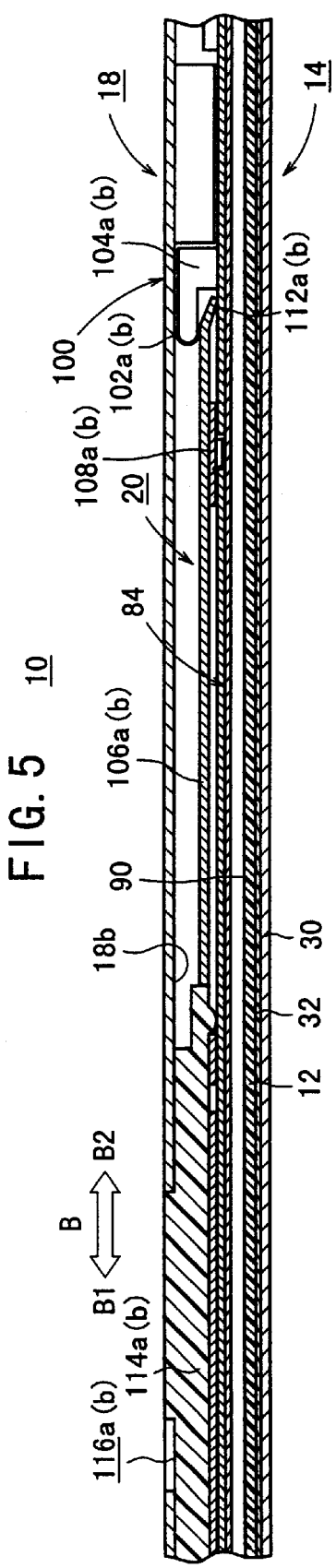
FIG. 5 is a fragmentary cross-sectional view showing the manner in which a stimulable phosphor sheet is released from being pressed by a support mechanism of the radiation cassette.
Figure 6:
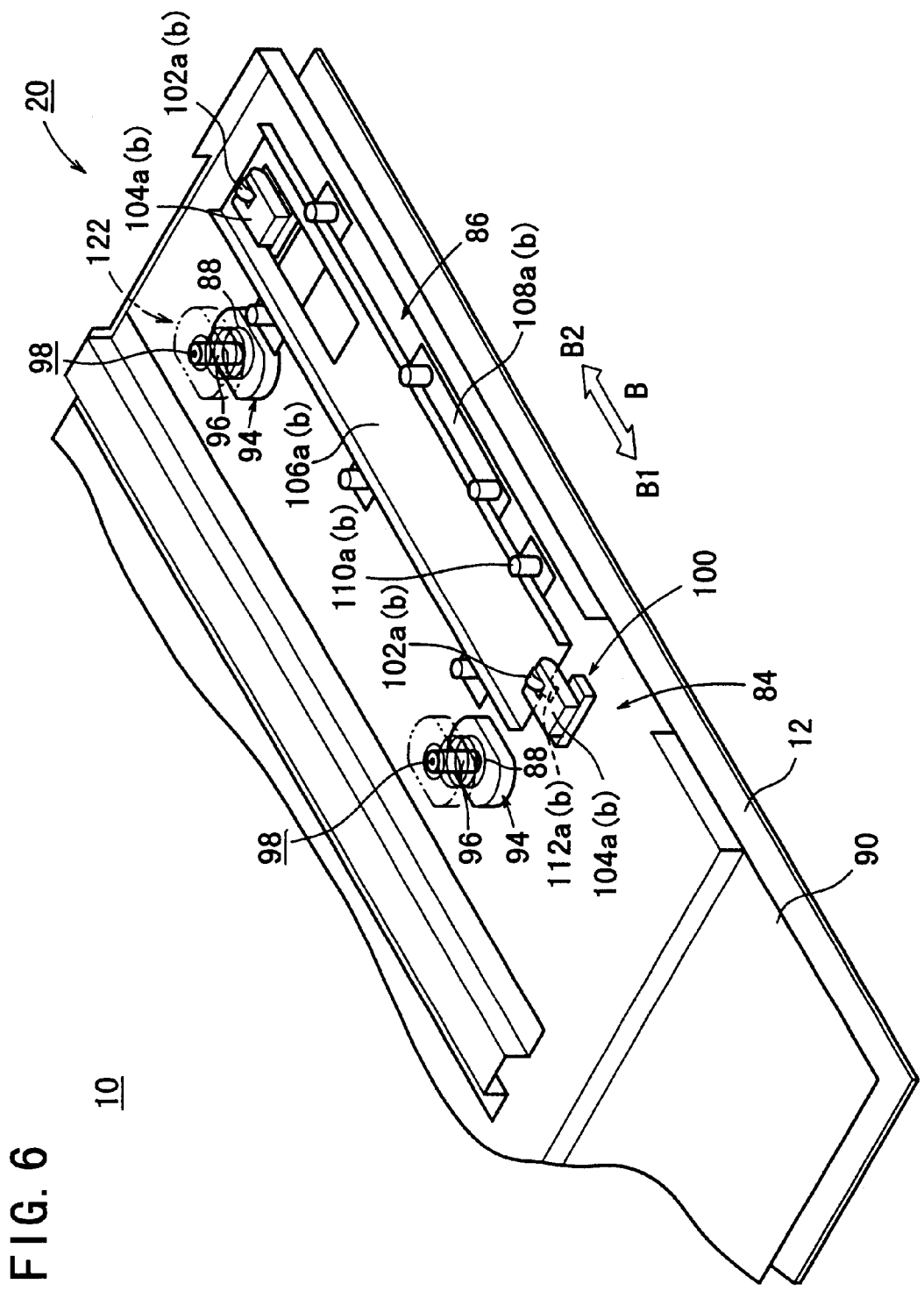
FIG. 6 is a perspective view of the support mechanism shown in FIG. 5.
Figure 7:
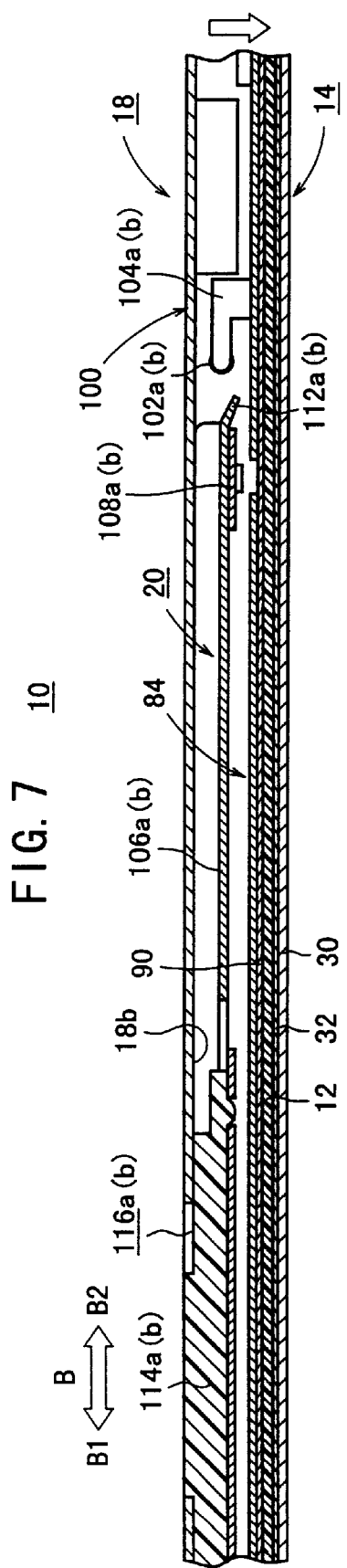
FIG. 7 is a fragmentary cross-sectional view showing the manner in which a stimulable phosphor sheet is pressed by the support mechanism of the radiation cassette.
Figure 8:
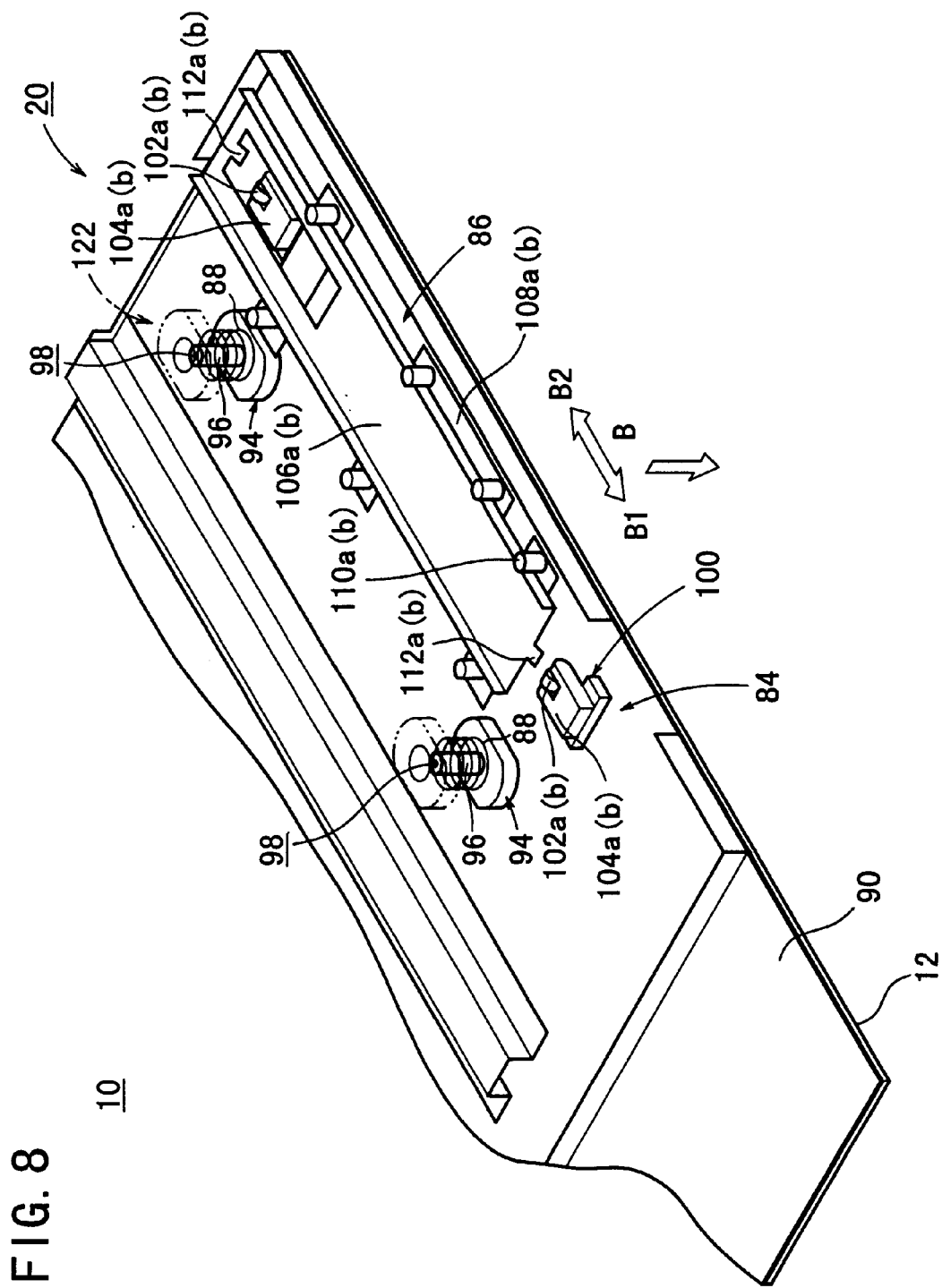
FIG. 8 is a perspective view of the support mechanism shown in FIG. 7.
Figure 9:
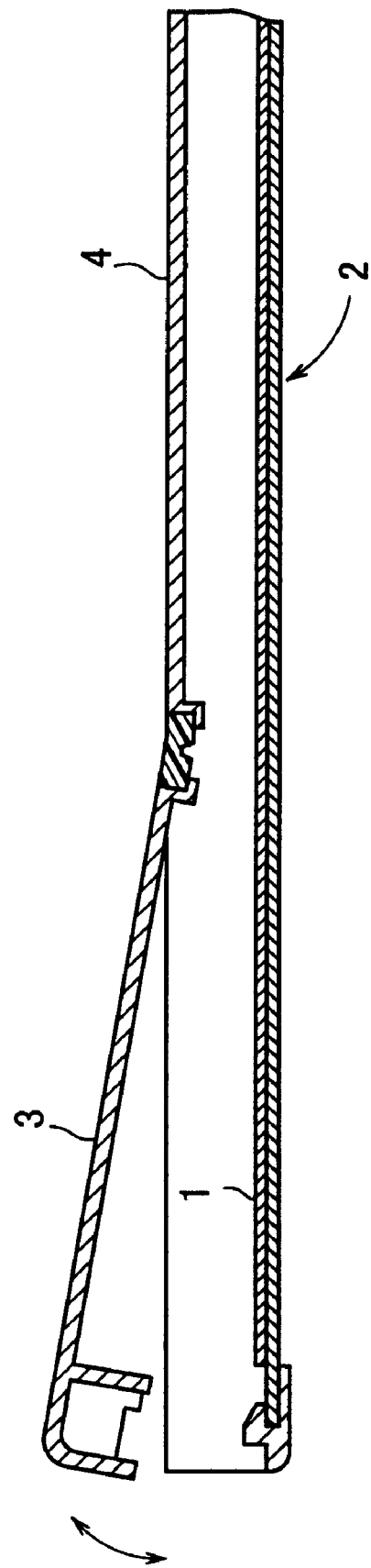
FIG. 9 is a vertical cross-sectional view of a conventional cassette.

When the stimulable phosphor sheet 12 is to be loaded into and unloaded out of the housing 14, the stimulable phosphor sheet 12 is released from being pressed by the support mechanism 20 (see FIG. 5). Therefore, the stimulable phosphor sheet 12 is smoothly and reliably delivered, and is effectively prevented from being scratched due to sliding contact thereof with the lead sheet 90 and the inner surface 14a of the housing 14.

The elastic member 80 for pressing the stimulable phosphor sheet 12 toward the inner surface 14a of the housing 14 is mounted on the inner surface 16a of the lid 16. The elastic member 80 is capable of pressing the stimulable phosphor sheet 12 in its entirety uniformly toward the inner surface 14a of the housing 14. The entire stimulable phosphor sheet 12 can thus be held in intimate contact with the lead sheet 90 for forming a high-quality image thereon with ease.

In the above embodiment, the stimulable phosphor sheet 12 has been described as the radiation image recording medium. However, a photographic film or the like may be used as the radiation image recording medium.

The radiation cassette according to the present invention allows the radiation image recording medium to be reliably held in intimate contact with the housing by the support mechanism for forming a desired image highly accurately on the radiation image recording medium. When the radiation image recording medium is to be loaded into and unloaded out of the housing, the radiation image recording medium is released from being pressed by the support mechanism. Therefore, the radiation image recording medium is smoothly and reliably delivered, and is effectively prevented from being scratched. Consequently, the radiation image recording medium can be loaded into and unloaded out of the housing, and a high-quality image can be formed on the radiation image recording medium, efficiently with a simple arrangement and process.

Although a certain preferred embodiment of the present invention has been shown and described in detail, it should be understood that various changes and modifications may be made therein without departing from the scope of the appended claims.

What is claimed is:

1. A radiation cassette comprising:
    a housing for accommodating a radiation image recording medium, said housing having a surface to which a radiation is applied;
    a lid openably and closably mounted on a portion of said housing;
    a light-shielding plate disposed in a remaining portion of said housing, said lid being swingably mounted on said light-shielding plate; and
    a support mechanism for pressing the radiation image recording medium against and supporting the radiation image recording medium on an inner surface of said housing when a radiation is applied to the radiation image recording medium, and releasing the radiation image recording medium from being pressed when the radiation image recording medium is loaded into and unloaded out of said housing.

2. A radiation cassette according to claim 1, wherein said support mechanism comprises:
    a presser plate mounted on an inner surface of said light-shielding plate for movement toward and away from said inner surface of said housing;
    a manipulating member operable from outside of said light-shielding plate for moving said presser plate toward and away from said inner surface of said housing; and
    a spring for normally urging said presser plate toward said inner surface of said housing.

3. A radiation cassette according to claim 2, wherein said manipulating member has a taper structure for moving said presser plate away from said inner surface of said housing upon movement in a direction within the plane of said light-shielding plate, and for moving said presser plate toward said inner surface of said housing upon movement in an opposite direction within the plane of said light-shielding plate.

4. A radiation cassette according to claim 3, wherein said taper structure comprises:
    slide plates supported for movement in opposite directions along the inner surface of said light-shielding plate; and
    rollers mounted on a reverse side of said presser plate;
    said slide plates comprising:
        knobs exposed out of said light-shielding plate and operable for movement thereon; and
        tapered members positioned for coaction with said rollers and bent away from said inner surface of said light-shielding plate.

5. A radiation cassette according to claim 2, further comprising:
    a holder for holding said presser plate on said inner surface of said light-shielding plate.

6. A radiation cassette according to claim 2, wherein said housing has a copper plate and a lead plate interposed between said copper plate and said presser plate, with the radiation image recording medium being sandwichable between said copper plate and said lead plate.

7. A radiation cassette according to claim 6, wherein said lead plate comprises a lead sheet applied to a face side of said presser plate.

8. A radiation cassette according to claim 1, further comprising:
    an elastic member mounted on an inner surface of said lid for pressing the radiation image recording medium toward said inner surface of said housing.

* * * * *